(12) United States Patent
Hurtis et al.

(10) Patent No.: US 9,576,265 B2
(45) Date of Patent: Feb. 21, 2017

(54) AUTOMATIC INVENTORY VARIANCE IDENTIFICATION

(75) Inventors: George Michael Hurtis, Rochester, MN (US); Ivory Wellman Knipfer, Rochester, MN (US); Manivannan Thavasi, Rochester, MN (US); Thembani Togwe, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 13/442,459

(22) Filed: Apr. 9, 2012

(65) Prior Publication Data

US 2012/0197768 A1  Aug. 2, 2012

Related U.S. Application Data

(63) Continuation of application No. 11/550,845, filed on Oct. 19, 2006, now Pat. No. 8,280,784.

(51) Int. Cl.
*G06Q 10/08* (2012.01)

(52) U.S. Cl.
CPC .................................. *G06Q 10/087* (2013.01)

(58) Field of Classification Search
CPC .. G06Q 10/087; G06Q 10/0637; G06Q 10/06; H04L 43/16
USPC .................... 705/28, 301, 348; 235/382, 385
See application file for complete search history.

(56) References Cited

U.S. PATENT DOCUMENTS

| | | |
|---|---|---|
| 3,739,471 A | 6/1973 | Peres |
| 4,549,644 A | 10/1985 | Bowles et al. |
| 5,242,046 A * | 9/1993 | Bailey ................... B65G 25/02 198/774.1 |
| 5,355,579 A | 10/1994 | Miyasaka et al. |
| 6,085,894 A | 7/2000 | Bedford |
| 6,523,328 B1 | 2/2003 | De Cardenas et al. |
| 6,681,990 B2 | 1/2004 | Vogler et al. |
| 7,175,081 B2 | 2/2007 | Andreasson et al. |
| 7,591,421 B2 | 9/2009 | Linton et al. |
| 7,669,765 B2 | 3/2010 | Harper et al. |
| 7,753,272 B2 | 7/2010 | Harper et al. |
| 7,755,482 B2 | 7/2010 | Hubbard |
| 7,798,312 B2 | 9/2010 | Brumm |
| 7,859,417 B2 | 12/2010 | Harper et al. |
| 7,947,299 B2 | 5/2011 | Knapp |
| 7,965,190 B2 | 6/2011 | Maloney |
| 2002/0035524 A1 | 3/2002 | Husslage |
| 2003/0216969 A1 | 11/2003 | Bauer et al. |
| 2004/0046020 A1 * | 3/2004 | Andreasson ............. A61J 1/14 235/385 |
| 2004/0069850 A1 | 4/2004 | De Wilde |

(Continued)

OTHER PUBLICATIONS

Notice of Allowance regarding U.S. Appl. No. 11/550,845, dated May 18, 2012, 10 pages.

(Continued)

*Primary Examiner* — Vanel Frenel

(74) *Attorney, Agent, or Firm* — Yee & Associates, P.C.; Damion Josephs

(57) ABSTRACT

Performing an inventory count is provided. A scan of an object is initiated according to a profile in order to perform the inventory count of the object. A scan result is compared with a recorded level for the object to determine if a variance exists between the scan result and the recorded level. A variance analysis is performed if the variance exists.

10 Claims, 4 Drawing Sheets

(56) References Cited

U.S. PATENT DOCUMENTS

| | | | |
|---|---|---|---|
| 2005/0086133 | A1 | 4/2005 | Scherer et al. |
| 2005/0197844 | A1 | 9/2005 | Ng et al. |
| 2006/0070853 | A1 | 4/2006 | Brumm |
| 2006/0081705 | A1 | 4/2006 | Linton et al. |
| 2006/0085293 | A1 | 4/2006 | Melucci |
| 2007/0059338 | A1 | 3/2007 | Knapp |
| 2007/0108273 | A1* | 5/2007 | Harper et al. ............... 235/382 |
| 2007/0115127 | A1 | 5/2007 | Harper et al. |
| 2008/0059338 | A1* | 3/2008 | Hubbard ............... G06Q 10/08 705/28 |
| 2008/0117053 | A1 | 5/2008 | Maloney |
| 2008/0120200 | A1 | 5/2008 | Hurtis et al. |
| 2008/0165013 | A1 | 7/2008 | Harper et al. |

OTHER PUBLICATIONS

"Improving Manufacturing Operations Efficiency Using RFID," Sun Microsystems, Inc., sun.com/rfid, Mar. 2004, 6 pages.

"Is your Warehouse Meeting your Supply Chain Demands?" Brochure, Radio Beacon Inc., http://www.itgusa.com/pdfs/Radio-Beacon-Inc-brochure.pdf, 2003, 4 pages.

"Managing Mobile Resources, Addressing the Asset Management Problem," RedPrairie Corporation, White Paper, http://www.redprairie.com/documents/white%20papers/MRM_Case_Studies.pdf, 2004, 10 pages.

"Radio Beacon WMS Technology that Extends Your Accounting Solution Right Into the Warehouse," Brochure, Radio Beacon Inc., http://www.itgusa.com/pdfs/Radio-Beacon-Inc-brochure.pdf, 2003, 4 pages.

"RFID: Uncovering the Value—Applying RFID within the Retail and Consumer Package Goods Value Chain", Metro Group, http://cache-www.intel.com/cd/00/00/22/34/223431_223431.pdf, 2004, 48 pages.

Hanebeck, "Process Management and RFID: Implications and Considerations for Process Management," Globe Ranger Corporation, White Paper, http://www.globeranger.com/papers/whitepaper_processes_mgmt_rfid.html, retrieved May 16, 2006, 6 pages.

Lee et al., "Unlocking the Value of RFID," Stanford University, Stanford, California, http://bctim.wustl.edu/calendar/mediafiles/RFIDLeeOzer.pdf, Mar. 2005, pp. 1-39.

Office Action, dated Jul. 2, 2008, regarding U.S. Appl. No. 11/550,845, 17 pages.

Response to Office Action, dated Oct. 2, 2008, regarding U.S. Appl. No. 11/550,845, 13 pages.

Final Office Action, dated Jan. 21, 2009, regarding U.S. Appl. No. 11/550,845, 16 pages.

Amendment Pursuant to Request for Continued Examination, dated Apr. 20, 2009, regarding U.S. Appl. No. 11/550,845, 11 pages.

Office Action, dated May 13, 2009, regarding U.S. Appl. No. 11/550,845, 18 pages.

Response to Office Action, dated Aug. 11, 2009, regarding U.S. Appl. No. 11/550,845, 18 pages.

Final Office Action, dated Nov. 4, 2009, regarding U.S. Appl. No. 11/550,845, 25 pages.

Appeal Brief, dated Mar. 29, 2010, regarding U.S. Appl. No. 11/550,845, 30 pages.

Examiner's Answer, dated Jun. 25, 2010, regarding U.S. Appl. No. 11/550,845, 36 pages.

Decision on Appeal, dated Feb. 29, 2012, regarding U.S. Appl. No. 11/550,845, 7 pages.

* cited by examiner

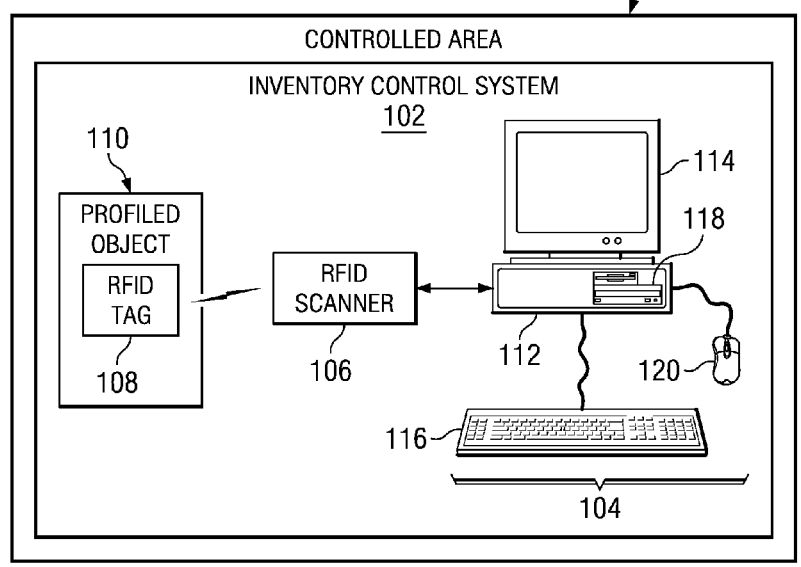
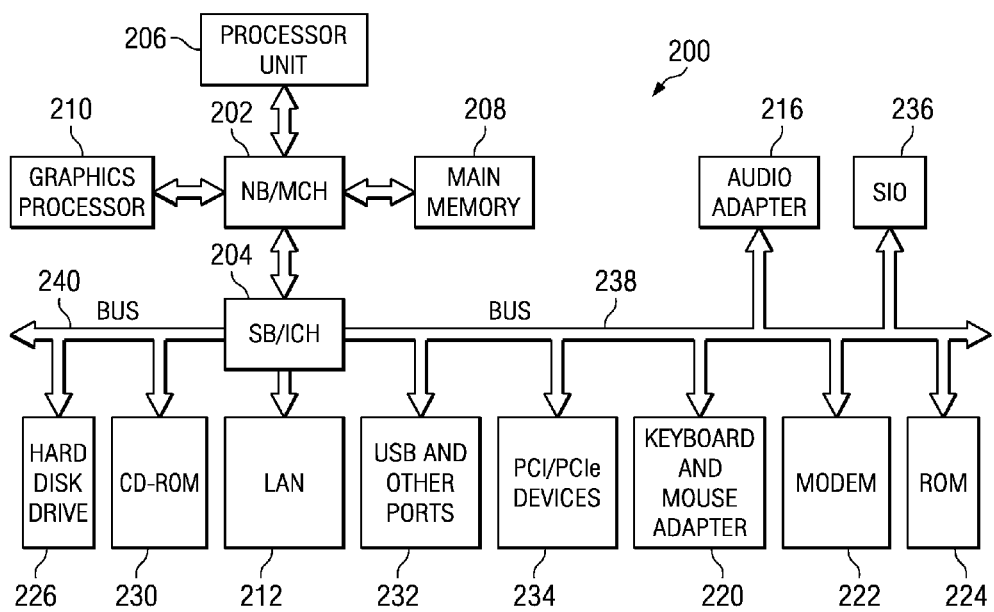

AUTOMATIC INVENTORY VARIANCE IDENTIFICATION

This application is a continuation of application Ser. No. 11/550,845, filed Oct. 19, 2006, status pending.

BACKGROUND OF THE INVENTION

1. Field of the Invention

The present invention relates generally to an improved data processing system. More specifically, the present invention is directed to a computer implemented method, system, and computer usable program code for performing an automatic digital rotating inventory count (RIC) using radio frequency identification (RFID) to facilitate the RIC and detect inventory variances in near real-time.

2. Description of the Related Art

Currently, production facilities use a standard inventory method known as a RIC to ensure that inventory accuracy is maintained. This standard RIC process requires facility personnel to go from part bin to part bin in order to physically count each part. The goal of this standard RIC process is to compare the physical part count against inventory management records to determine if any variance exists between the part count and the records. If facility personnel discover a variance, then an inventory coordinator is assigned to investigate the discrepancies and to initiate actions to reconcile the differences.

However, this standard RIC process is an expensive manual process that impacts operations, especially during peak production periods. The standard RIC process may create an interruption in manufacturing capacity either by production stoppage or by directly impacting production personnel workload. In addition, a RIC may become outdated and a subsequent RIC may not be performed as scheduled because of the impact on production. As a result, the purpose of performing a RIC is defeated. Consequently, serious impacts to the production facility may occur due to problems associated with unrecognized inventory variances.

Material requirements planning (MRP) is a software based production planning and inventory control system used to manage manufacturing processes. An MRP system is utilized to ensure materials and products are available for production and delivery to customers, while managing inventory levels and planning execution of various manufacturing activities, such as a RIC.

These MRP systems require production facility personnel to intercept a request to perform a RIC and then take action on the RIC request. As discussed above, these actions are slow, manually intensive, and expensive. In addition, these actions result in stoppage of production and loss of use of inventory locations during the counting process. The production facility incurs these negative impacts during the performance of every standard RIC regardless of the presence of any inventory variance. Furthermore, these processes also are subject to human counting errors and often need to be performed multiple times when a variance occurs.

Therefore, it would be beneficial to have an improved computer implemented method, system, and computer usable program code for performing an automatic digital RIC using RFID to facilitate the RIC and identify an inventory variance in near real-time.

BRIEF SUMMARY OF THE INVENTION

Illustrative embodiments provide a computer implemented method, system, and computer usable program code for performing an inventory count. A scan of an object is initiated according to a profile to perform the inventory count of the object. The inventory count is automatically performed according to the profile in near real-time. Further, the inventory count may be performed on a plurality of objects at a same time.

The object may be an inanimate object, animal, or human. Also, the object may be one or more of the same object. The one or more of the same object may be counted individually or in a group. The group may be counted by a box, pallet, bin, room, building, or yard that contains the one or more of the same object. Furthermore, the object may be one of a plurality of different objects. Moreover, the object is a profiled object and the profiled object has an associated profile.

The profile may include one or more profiles of one or more objects to be scanned. The profile may include when to perform the inventory count of the object, how to perform the inventory count of the object, object data, object location, and variance analysis procedures. Object data may include a name, identification number, serial number, and description of the object.

The object includes a radio frequency identification tag. The radio frequency identification tag may be a shortwave, high frequency, ultra high frequency, microwave, wireless fidelity, or Bluetooth radio frequency identification tag. A radio frequency identification scanner reads and counts the radio frequency identification tags associated with the object. As a result, the radio frequency identification scanner performs the inventory count of the object.

The object to be scanned is locked to perform the inventory count. Locking the object may include locking an enclosure containing the object or stopping movement of the object in order to perform the scan. A scan result is compared with a recorded level for the object to determine if a variance exists between the scan result and the recorded level. Comparing the scan result with the recorded level generates a comparison result and the comparison result is logged in a storage unit.

If a variance exists, a variance analysis may be performed. Variance analysis may include variance analysis procedures, such as scanning adjacent areas to the object location or other areas defined in the profile to assist in resolving the variance. Also, if a variance exists a variance report may be displayed.

If a variance does not exist, the object is unlocked. Unlocking the object may include unlocking the enclosure containing the profiled object or allowing movement of the profiled object once again. Consequently, normal operation of the inventory control system is resumed if a variance does not exist.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of an inventory control system in which illustrative embodiments may be implemented;

FIG. 2 is a block diagram of a data processing system in which illustrative embodiments may be implemented;

DETAILED DESCRIPTION OF THE INVENTION

Figure 3:
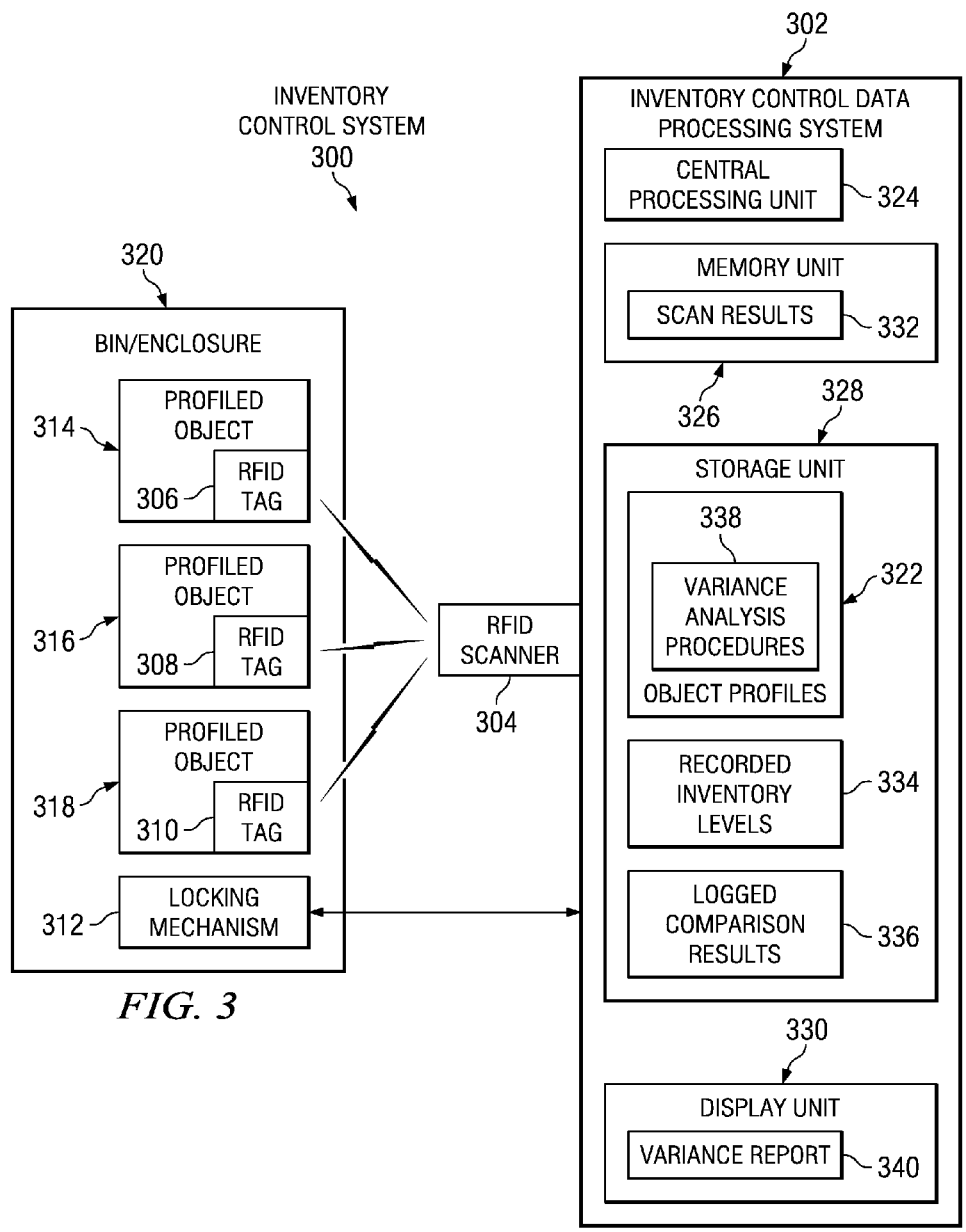
FIG. 3 is a block diagram of a data processing system that includes a radio frequency identification scanner and a locking mechanism in accordance with an illustrative embodiment.

With reference now to the figures and in particular with reference to FIG. 1, a pictorial representation of an inventory control system is shown in which illustrative embodiments may be implemented. Controlled area 100 may represent any type and size building with one or more areas where one or more objects may be located. An object may, for example, be a person, animal, or inanimate object. In addition, controlled area 100 may include a yard, or other similar outdoor area, where the objects may be located. Moreover, any type of entity, such as, for example, a business, non-profit organization, manufacturer, governmental agency, educational institution, library, research facility, and the like, may use controlled area 100. In other words, illustrative embodiments do not consider the controlled area, the objects within or adjacent to the controlled area, and the entity using the controlled area as important factors to processes of illustrative embodiments.

Inventory control system 102 includes inventory control computer 104, radio frequency identification (RFID) scanner 106, RFID tag 108, and profiled object 110. However, it should be noted that illustrative embodiments may include more or fewer components in inventory control system 102. Also, illustrative embodiments may include any type of component within inventory control system 102 to accomplish processes of illustrative embodiments. The entity uses inventory control system 102 to, for example, identify, count, and/or monitor objects within or adjacent to controlled area 100. Further, it should be noted that the components of inventory control system 102 may all be located within controlled area 100 or may be located within separate structures or open areas. For example, inventory control computer 104 may reside in its own building or at a remote site from scanner 106 and profiled object 110.

Inventory control computer 104 includes system unit 112, video display terminal 114, keyboard 116, storage devices 118, which may include floppy drives and other types of permanent and removable storage media, and mouse 120. Additional input devices may be included with inventory control computer 104. Examples of additional input devices include a joystick, touchpad, touch screen, trackball, microphone, and the like.

Inventory control computer 104 may be any suitable computer, such as an IBM® eServer™ computer or IntelliStation® computer, which are products of International Business Machines Corporation, located in Armonk, N.Y. In addition, inventory control computer 104 may be a programmable logic controller (PLC). A PLC is packaged and designed for extended temperature ranges, dirty or dusty conditions, immunity to electrical noise, and is mechanically more rugged and resistant to vibration and impact. Although the depicted representation shows a personal computer, other embodiments may be implemented in other types of data processing systems. For example, other embodiments may be implemented in a network computer. Inventory control computer 104 also preferably includes a graphical user interface (GUI) that may be implemented by means of systems software residing in computer readable media in operation within inventory control computer 104.

Inventory control computer 104 uses RFID scanner 106 to read or interrogate RFID tag 108 located in, on, or adjacent to profiled object 110. RFID is a generic term for technologies that use radio waves for automatic identification of people, animals, and objects. RFID technology is used in a variety of applications that may include, for example, retail, industrial, transportation, tracking, and security. However, illustrative embodiments are not restricted to the above-listed areas. Illustrative embodiments may be utilized by any type of entity desiring the ability to, for example, indicate the presence of an object, obtain data associated with the object, or for identifying the object in real time using RFID.

RFID technology allows for non-contact reading by utilizing the RFID tag. Illustrative embodiments may, for example, utilize shortwave, high frequency, ultra high frequency, microwave, wireless fidelity (Wi-Fi), or Bluetooth for wireless communication between the RFID scanner 106 and RFID tag 108. However, it should be noted that illustrative embodiments may use any wireless communication means for communication between the RFID scanner 106 and RFID tag 108 that are suitable for processes of illustrative embodiments and are not limited to the immediately preceding list.

An RFID tag is an item that may be attached to or incorporated into a product, animal, or person. The RFID tag, also known as an "electronic label," "transponder," or "code plate," is made up of an RFID chip attached to an antenna. Like Universal Product Code (UPC) bar codes, RFID tags identify objects. However, unlike UPC bar codes, which must be in close proximity and in line of sight of the scanner for reading, RFID tags do not require line of sight and may be embedded within objects or packages.

Passive RFID tags have no internal power supply. The minute electrical current induced in the antenna by the incoming radio frequency signal provides just enough power for the integrated circuit in the tag to power up and transmit back (backscatter) a response.

Active RFID tags are typically much more reliable in that active RFID tags produce fewer errors than passive RFID tags due to the ability for active RFID tags to conduct a "session" with an RFID reader. Also, active RFID tags, due to their onboard power supply, transmit at higher power levels than do passive RFID tags, which allows active RFID tags to be more effective at longer distances or in "radio frequency challenged" environments like, for example, water, which humans and animals are mostly made of, or metal, which shipping containers and vehicles are mostly made of.

Semi-passive RFID tags, also known as semi-active tags, combine passive backscattering with a battery that allows the tag to perform some operations but not to periodically beam signals as do some active RFID tags.

Reusable RFID tags may be used for many years. The chip and antenna for the reusable RFID tags are built into a rigid housing. Like regular electronic components, these reusable RFID tags are adhered to rigid substrates and packaged in plastic enclosures. In contrast, disposable RFID tags are used for a much shorter period of time and are then destroyed. Disposable RFID tags may, for example, be adhered to printed, flexible labels that may be pasted onto a shipping carton or onto profiled object 110, itself. These "smart labels" contain the RFID chip and antenna on the back.

The RFID scanner or reader, also known as an RFID interrogator, is a transmitter/receiver that reads the contents of RFID tags that are in the vicinity of the scanner. For example, RFID scanner 106 reads the contents of RFID tag 108 that is in the vicinity of RFID scanner 106. RFID scanner 106 converts the radio waves reflected back from RFID tag 108 into digital data that may then be conveyed to inventory control computer 104, which may utilize the information. RFID scanner 106 may be a mobile scanner or a stationary scanner. RFID scanner 106 includes an antenna that emits radio carrier signals to activate RFID tag 108 and read data from RFID tag 108, and a decoder for decoding the data read. The electrical field generated by the antenna may be constant or activated by actuation means, such as a sensor or a trigger.

RFID scanner 106 and RFID tag 108 may be configured to operate using inductive coupling, electrostatic coupling, or electromagnetic coupling, in which induction of a current in a coil, induction of a voltage on a plate, or a magnetic field, respectively, may be used as a means for transferring data and/or power. The operational distance between RFID scanner 106 and RFID tag 108 depends on the configuration of the scanner and tag, as well as the frequency and power of the transmitted signals. Also, depending on the configuration of inventory control system 102, there may not be a need to orient RFID tag 108 in a particular orientation for a successful read by RFID scanner 106.

RFID tag 108 may be programmed with unique information, such as encoded data that includes an identifying code. For example, an Electronic Product Code™ (EPC), which is administered by EPCGlobal, Inc.®, is a standard code for RFID tags. The EPC number, which may be from 64 to 256 bits, may contain the following data: EPC version, company identification number, product number, and unique serial number. A 96-bit EPC, for example, is capable of differentiating 68 billion items for each of 16 million products within each of 268 million companies. Unlike UPC bar codes, which do not have serial numbers, the EPC enables tracking of individual objects because every object may be uniquely identified. As a result, the unique EPC serial number within the RFID tag allows an RFID scanner to, for example, read all the RFID tags in a pallet of objects without having to break the pallet down. However, it should be noted that illustrative embodiments are not limited to the use of an EPC serial number within the RFID tag. Illustrative embodiments may utilize any type of unique identification system within RFID tag 108.

Benefits of using RFID may, for example, include the reduction of labor costs, simplification of business processes, and reduction of inventory inaccuracies. RFID may achieve these benefits by eliminating discrepancy between inventory records and physical inventory and preventing or reducing sources of error. Further, RFID technology permits non-contact reading without the need for line of sight interrogation.

Profiled object 110 may represent any object, such as a person, animal, or inanimate object, that has a profile of the object input into inventory control computer 104. A profile may, for example, include profiled object data. Profiled object data is any data or information about profiled object 110 that may be contained in the profile. For example, the profiled object data may include a name, identification number, serial number, and description of profiled object 110. However, it should be noted that illustrative embodiments may include any necessary information to identify and describe profiled object 110 within the profiled object data.

Further, the profile may include specific dates and times for when profiled object 110 is to be scanned for an inventory count and the specific location of profiled object 110 within the entity. Furthermore, the profile may include instructions as to how inventory control system 102 is to perform the inventory count of profiled object 110. For example, profiled object 110 may represent one or more objects, each of which includes an RFID tag, such as RFID tag 108. Consequently, the profile instructs inventory control system 102 to count each individual profiled object.

Alternatively, profiled object 110 may represent a plurality of the same object with only one RFID tag. For example, profiled object 110 may be a box or pallet full of the same electrical part that is identified and described by only one RFID tag placed on the outside of the shipping container. As a result, the profile instructs inventory control system 102 to count profiled object 110 as a group. However, it should be noted that the group may be one of a plurality of groups of the same profiled object. So, each group may be counted, for example, by the box, pallet, bin, room, building, or yard that contains the group of profiled objects.

Moreover, profiled object 110 may be one of a plurality of different profiled objects. In other words, profiled object 110 may be one of any number of profiled objects to be monitored and/or counted by inventory control system 102. Also, it should be noted that inventory control system 102 may identify, monitor, and/or count one or more of the plurality of profiled objects at the same time in near real-time.

With reference now to FIG. 2, a block diagram of a data processing system is depicted in which illustrative embodiments may be implemented. Data processing system 200 is an example of a computer, such as inventory control computer 104 in FIG. 1, in which code or instructions implementing the processes of illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206. This operating system coordinates and controls various components within data processing system 200 in FIG. 2. The operating system may be a commercially available operating system, such as Microsoft® Windows XP®. Microsoft® and Windows XP® are trademarks of Microsoft Corporation in the United States, other countries, or both. An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processor 206. The processes of illustrative embodiments may be performed by processor 206 using computer implemented instructions, which may be located in a memory. An example of a memory is main memory 208, read only memory 224, or in one or more peripheral devices.

The hardware shown in FIG. 2 may vary depending on the implementation of illustrated embodiments. Other internal hardware or peripheral devices, such as flash memory, equivalent non-volatile memory, or optical disk drives and the like, may be used in addition to or in place of the hardware depicted in FIG. 2. Additionally, the processes of the illustrative embodiments may be applied to a multiprocessor data processing system.

The systems and components shown in FIG. 2 may be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 may be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, illustrative embodiments provide for a computer implemented method, apparatus, and computer usable program code for compiling source code and for executing code. The methods described with respect to the depicted embodiments may be performed in a data processing system, such as inventory control computer 104 shown in FIG. 1 or data processing system 200 shown in FIG. 2.

Illustrative embodiments provide a computer implemented method, system, and computer usable program code for performing an inventory count of objects in near real-time using RFID. In response to receiving an MRP generated request to perform a RIC, an inventory control data processing system initiates a scan of an object according to the profile in order to perform the inventory count of the object. The inventory control data processing system automatically performs the inventory count according to the profile in near real-time. Further, the inventory control data processing system may perform the inventory count on a plurality of objects at a same time.

The object may be an inanimate object, animal, or human. Also, the object may be one or more of the same object. The inventory control data processing system may count the one or more of the same object individually or in a group. The inventory control data processing system counts the group by a box, pallet, bin, room, building, or yard that contains the one or more of the same object. Furthermore, the object may be one of a plurality of different objects under the control of an entity. Moreover, the object is a profiled object and the profiled object has an associated profile.

The profile may include one or more profiles of the object to be scanned. In addition, the profile may include when to perform the inventory count of the object, how to perform the inventory count of the object, object data, and an object location. Object data may include a name, identification number, serial number, and description of the object. The profile also may include variance analysis procedures to perform, such as scanning adjacent areas to the object location or other locations defined in the profile, should the inventory control data processing system identify a variance.

The object includes a radio frequency identification tag. The radio frequency identification tag may be a shortwave, high frequency, ultra high frequency, microwave, wireless fidelity, or Bluetooth radio frequency identification tag. The inventory control data processing system uses a radio frequency identification scanner to read and count the radio frequency identification tag associated with the object. Therefore, the inventory control data processing system performs the inventory count of the object by using the radio frequency identification scanner.

The inventory control data processing system locks the object to be scanned to perform the inventory count. Locking the object may include locking an enclosure containing the object or stopping movement of the object in order to perform the scan. In response to receiving a scan result of the object, the inventory control data processing system compares the scan result with a recorded level for the object to determine if a variance exists between the scan result and the recorded level. The inventory control data processing system generates a comparison result by comparing the scan result with the recorded level. Then, the inventory control data processing system logs the comparison result in a storage unit.

If a variance exists, the inventory control data processing system performs a variance analysis based on actions defined in the object profile for that object. The variance analysis may include scanning adjacent areas to the object location to assist personnel in resolving the variance. Also, if a variance exists the inventory control data processing system displays a variance report in a display unit.

If a variance does not exist, the inventory control data processing system unlocks the object. Unlocking the object may include unlocking the enclosure containing the profiled object or allowing movement of the profiled object once again. Consequently, normal operation of the inventory control system is resumed if a variance does not exist.

Using illustrative embodiments, an entity may minimize production impacts by successfully performing near real-time rotating inventory counts and consuming vital resources only when a variance is discovered. Illustrative embodiments ensure that rotating inventory counts are performed as scheduled and in a timely manner, even though the entity may be at peak production. In addition, illustrative embodiments reduce personnel required to physically count inventory objects, such as parts, and reduce human counting errors. Thus, illustrative embodiments substantially decrease the time required to perform an inventory count, increase accuracy, assist in decreasing variance resolution time, and help to decrease lost assets.

With reference now to FIG. 3, a block diagram of a data processing system that includes an RFID scanner and a locking mechanism is depicted in accordance with an illustrative embodiment. Inventory control system 300 includes inventory control data processing system 302, RFID scanner 304, and RFID tags 306, 308, and 310, such as, for example, inventory control system 102 includes inventory control computer 104, RFID scanner 106, and RFID tag 108 in FIG. 1. However, it should be noted that illustrative embodiments are not limited to one inventory control data processing system, one RFID scanner, and three RFID tags within inventory control system 300. Illustrative embodiments may, for example, include one or more inventory control data processing systems, one or more RFID scanners, one or more RFID tags, or any combination thereof within inventory control system 300. In other words, inventory control system 300 is only shown for illustration purposes and is not intended as an architectural limitation on illustrative embodiments.

Further, inventory control system 300 includes locking mechanism 312. Locking mechanism 312 represents any type of locking mechanism that may prevent or restrict the movement of profiled objects 314, 316, and 318 during an inventory count. For example, locking mechanism 312 may represent an electrical lock on bin/enclosure 320, which inventory control data processing system 302 locks to prevent the removal of profiled objects 314, 316, and 318 from bin/enclosure 320 during a scheduled inventory count in accordance with object profiles, such as object profiles 322. Or, locking mechanism 312 may represent a locking mechanism for a mechanical part picker to prevent removal of profiled object 314, 316, or 318 from bin/enclosure 320 during a scheduled real time inventory count. Or, locking mechanism 312 may represent a locking mechanism for a conveyer or production line system to halt movement of profiled objects 314, 316, and 318 during a scheduled real time inventory count.

Bin/enclosure 320 represents any type of enclosure, such as, for example, a box, pallet, bin, room, building, or yard, which contains profiled objects 314, 316, and 318. Profiled objects 314, 316, and 318 may represent the same profiled object or a plurality of different profiled objects. Profiled objects 314, 316, and 318 each include RFID tags 306, 308, and 310, respectively. Alternatively, a single RFID tag may be placed on the outside of bin/enclosure 320 to collectively identify profiled objects 314, 316, and 318. In addition, bin/enclosure 320 may represent a plurality of bin/enclosures that contain one or more of the same or different profiled objects inside.

Inventory control data processing system 302 includes RFID scanner 304 and uses RFID scanner 304 to scan RFID tags 306, 308, and 310 to identify, count, and/or monitor profiled objects 314, 316, and 318, respectively. Inventory control data processing system 302 also includes central processing unit 324, memory unit 326, and storage unit 328, such as, for example, data processing system 200 includes processor unit 206, main memory 208, and hard disk drive 226 in FIG. 2. Storage unit 328 also may be, for example, CD-ROM 230 or ROM 224 in FIG. 2, a floppy diskette, or a remote storage device coupled to inventory control data processing system 302 by a network. In addition, inventory control data processing system 302 also includes display unit 330, such as, for example, video display terminal 114 in FIG. 1.

Central processing unit 324 provides data processing capabilities for inventory control data processing system 302. An operating system runs on central processing unit 324, which coordinates and provides control of various components within inventory control data processing system 302. In addition, software applications executing on inventory control data processing system 302 may run in conjunction with the operating system.

Storage unit 328 stores the instructions for the operating system and applications for inventory control data processing system 302. The instructions are loaded into memory unit 326 for execution by central processing unit 324. Central processing unit 324 performs processes of illustrative embodiments by executing the computer usable program code that is loaded into memory unit 326. Alternatively, the computer usable program code may be loaded into one or more peripheral devices for execution by central processing unit 324. Further, inventory control data processing system 302 uses memory unit 326 to retain scan results 332. Scan results 332 is data obtained as a result of a scan performed by RFID scanner 304 on RFID tags 306, 308, and/or 310. The scan results data may, for example, be the name, identification number, serial number, description, and number or quantity of profiled objects 314, 316, and/or 318.

Storage unit 328 also stores object profiles 322, recorded inventory levels 334, and logged comparison results 336. Object profiles 322 may, for example, be input by a system administrator or other user utilizing input devices, such as, for example, keyboard 116 and/or mouse 120 in FIG. 1. Alternatively, the system administrator may download object profiles 322 into inventory control data processing system 302 from a storage device, such as storage devices 118 in FIG. 1.

Object profiles 322 may include one or more object profiles. Object profiles are profiles of profiled objects 314, 316, and 318. A profile may, for example, include profiled object data for profiled objects 314, 316, and 318, such as a name, identification and/or serial number, and description of the object. Also, the profile may include information such as when to perform a scan of profiled objects 314, 316, and 318, location of profiled objects 314, 316, and 318 within the entity, such as within bin/enclosure 320, and how to scan profiled objects 314, 316, and 318. In other words, the profile instructs inventory control data processing system 302 as to what to scan, when to scan, where to scan, and how to scan the profiled objects.

Additionally, object profiles 322 may also contain variance analysis procedures 338. Variance analysis procedures 338 include actions that inventory control data processing system 302 is to perform when inventory control data processing system 302 identifies a variance. Such actions may, for example, include scanning adjacent areas to the location where the object is expected to reside or other areas as defined in the object profile.

Recorded inventory levels 334 are the entity's known inventory levels for profiled objects 314, 316, and 318, which storage unit 328 stores. A system administrator may input recorded inventory levels 334 into storage unit 328 or recorded inventory levels 334 may be downloaded from a storage medium, such as a diskette, or from another network data processing system. Inventory control data processing system 302 uses recorded inventory levels 334 to compare with scan results 332. Inventory control data processing system 302 logs the results of the comparison between the scan results 332 and recorded inventory levels 334 in logged comparison results 336. Inventory control data processing system 302 compares recorded inventory levels 334 with scan results 332 to determine if a variance exists between recorded inventory levels 334 and scan results 332. A variance is any difference or discrepancy between the recorded levels of the scanned profiled object and the scan results.

If a variance does exist between recorded inventory levels 334 and scan results 332, then inventory control data processing system 302 performs variance analysis procedures 338. For example, variance analysis procedures 338 may, for example, direct inventory control data processing system 302 to scan the areas adjacent to bin/enclosure 320, which contains the scanned profiled object. Consequently, inventory control data processing system 302 directs RFID scanner 304 to scan the adjacent areas to bin/enclosure 320 in order to discover if any of the scanned profiled objects had been, for example, dropped, misplaced, or improperly profiled. By scanning the adjacent areas around where the scanned profiled object is supposed to be located according to the profile, inventory data processing system 302 assists personnel in reconciling the variance.

In addition to performing variance analysis procedures 338, inventory control data processing system 302 may display variance report 340 in display unit 330. Variance report 340 may, for example, includes the discovered variance for the scanned profiled object, logged comparison results 336, variance analysis procedures 338 performed, possible solutions, and/or other procedures to be performed by personnel to rectify the variance. Further, inventory control data processing system 302 may send variance report 340 to, for example, other network data processing systems coupled to inventory control data processing system 302 to notify appropriate management personnel of the discovered variance(s).

If a variance does not exist between recorded inventory levels 334 and scan results 332, then inventory control data processing system 302 may, for example, unlock locking mechanism 312 to reopen bin/enclosure 320, or allow movement of profiled objects 314, 316, and/or 318 once again, after the scan is completed according to object profiles 322 in near real-time. After inventory control data processing system 302 unlocks locking mechanism 312, inventory control system 300 resumes normal operation without variance analysis procedures 338 being performed or variance report 340 being generated.

Figure 4:
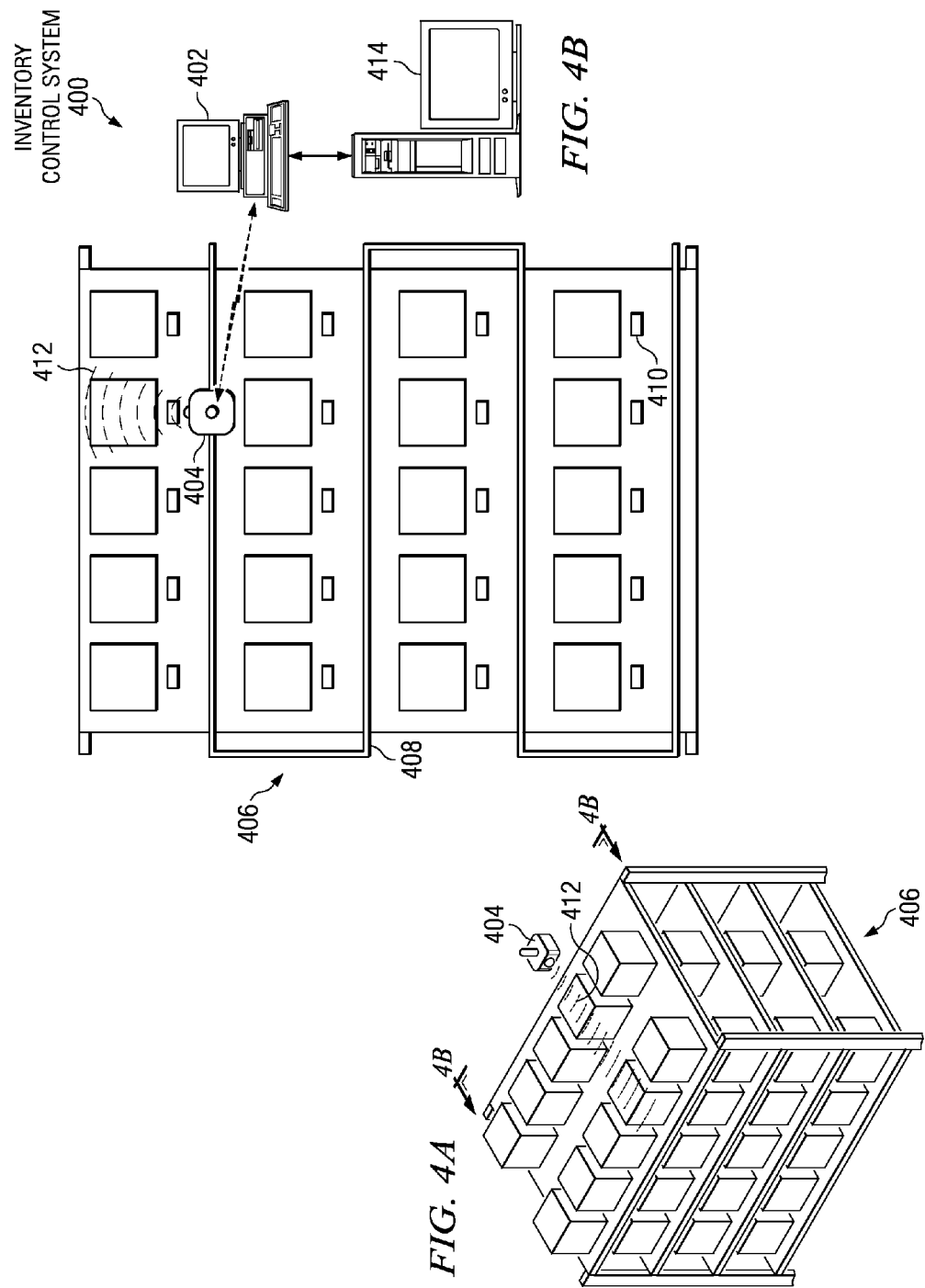
FIG. 4A is a three-dimensional pictorial representation of a specific example of a flow rack implementation of an inventory control system in accordance with an illustrative embodiment.
FIG. 4B is a back view of the flow rack implementation shown in FIG. 4A in accordance with an illustrative embodiment.

With reference now to FIGS. 4A and 4B. FIG. 4A shows a three-dimensional pictorial representation of a specific example of a flow rack implementation of an inventory control system in accordance with an illustrative embodiment. FIG. 4B depicts a back view of the flow rack implementation shown in FIG. 4A in accordance with an illustrative embodiment.

Inventory control system 400 includes inventory control computer 402 and RFID scanner 404, such as, for example, inventory control system 300 includes inventory control data processing system 302 and RFID scanner 304 in FIG. 3. Inventory control system 400 also includes storage rack 406, such as, for example, bin/enclosure 320 in FIG. 3, RFID scanner track 408, stop points 410, and network computer 414. However, it should be noted that FIG. 4A and FIG. 4B are only shown for illustration purposes and are not meant as architectural limitations on illustrative embodiments. Illustrative embodiments may include more or fewer components that are necessary to accomplish processes of illustrative embodiments.

Inventory control computer 402 uses RFID scanner 404 to scan a plurality of profiled objects that include RFID tags, such as, for example, profiled objects 314, 316, and 318 include RFID tags 306, 308, and 310, which are located in storage rack 406. In the illustrative example of FIGS. 4A and 4B, RFID scanner 404 is a mobile RFID scanner that utilizes RFID scanner track 408 to traverse to and scan the multiple tiers of profiled objects in storage rack 406. It should be noted that even though FIGS. 4A and 4B illustrate an RFID scan of a three-dimensional area, illustrative embodiments may be utilized to perform an inventory count in a two-dimensional area as well. Inventory control computer 402 directs mobile RFID scanner 404 to move to a specified location for the profiled object(s) to be scanned according to the object profile(s), such as, for example, object profiles 322 in FIG. 3. A system administrator inputs or downloads the one or more object profiles into inventory control computer 402 prior to performance of the inventory count.

The specific location of each profiled object is specified in the object profile of each profiled object and is represented by stop points 410. Radio frequency (RF) scan beam 412, which is output from RFID scanner 404, may, for example, be attenuated or focused to the width of the stocking or storage location of the profiled object to be scanned in storage rack 406 for a more accurate read of the RFID tags located on, in, or around the profiled object. After performing the scheduled inventory scan of the profiled object in storage rack 406, RFID scanner 404 sends the results of the scan, such as, for example, scan results 332 in FIG. 3, to inventory control computer 402 by wire or wireless communication.

Then, inventory control computer 402 compares the scan results with recorded inventory levels of the profiled object, such as, for example, recorded inventory levels 334 in FIG. 3, to determine if a variance exists. If a variance does not exist, inventory control system 400 continues normal operation. If a variance does exist, then inventory control computer 402 performs variance analysis procedures, such as, for example, variance analysis procedures 338 in FIG. 3, which may include scanning the area in and around storage rack 406 to discover if more of the scanned profiled object may be found nearby its profile-specified location. Subsequent to performing the variance analysis procedures, inventory control computer 402 displays a variance report on its monitor, such as, for example, display unit 330 displays variance report 340 in FIG. 3, for personnel to read. In addition, inventory control computer 402 sends the variance report to network computer 414 by wire or wireless communication for managerial personnel to read and/or print the report.

Figure 5:
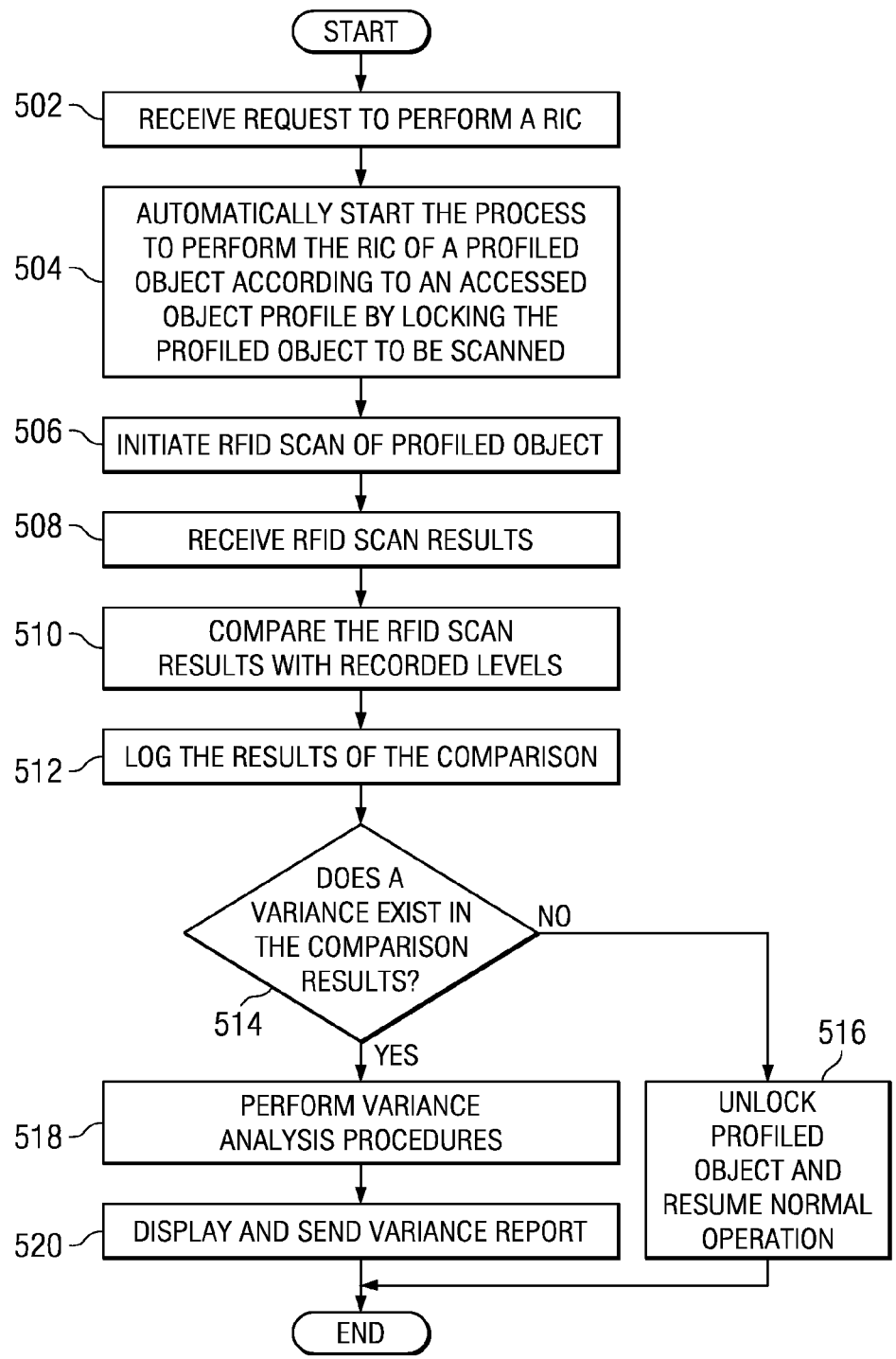
FIG. 5 is a flowchart illustrating an exemplary process for performing an inventory count of a profiled object in accordance with an illustrative embodiment.

With reference now to FIG. 5, a flowchart illustrating an exemplary process for performing an inventory count of a profiled object is shown in accordance with an illustrative embodiment. The process shown in FIG. 5 may be implemented in an inventory control data processing system, such as, for example, inventory control data processing system 302 in FIG. 3.

The process begins when inventory control data processing system receives a request to perform a RIC from an MRP system (step 502). The MRP system may, for example, reside within the inventory control data processing system or may reside in a remote system, such as network computer 414 in FIG. 4B. Subsequent to receiving the request to perform the RIC in step 502, the inventory control data processing system automatically starts the process to perform the RIC of a profiled object, such as, for example, profiled object 314 in FIG. 3, according to an accessed object profile, such as, for example, object profiles 322 in FIG. 3, by locking the profiled object to be scanned (step 504). The inventory control data processing system uses a locking mechanism, such as, for example, locking mechanism 312 in FIG. 3, to lock the profiled object to be scanned within an enclosure, such as, for example, bin/enclosure 320 in FIG. 3, to prevent removal or movement of the profiled object from the enclosure during the near real-time inventory count.

After locking the profiled object within the enclosure in step 504, the inventory control data processing system uses an RFID scanner, such as, for example, RFID scanner 304 in FIG. 3, to scan the profiled object (step 506). The profiled object includes an RFID tag, such as, for example, RFID tag 306 in FIG. 3, which may be attached directly to the profiled object or to a container, such as a box or pallet that contains the profiled object. The RFID scanner reads the RFID tag data during the scan. Then, the inventory control data processing system receives the result of the RFID scan, such as, for example, scan results 332 in FIG. 3, in a memory unit, such as, for example, memory unit 326 in FIG. 3 (step 508).

Subsequent to receiving the scan results in step 508, the inventory control data processing system compares the received scan results with recorded inventory levels for the profiled object, which are stored in a storage unit, such as, for example, recorded inventory levels 334 stored in storage unit 328 in FIG. 3 (step 510). Then, the inventory control data processing system logs the result of the comparison, such as, for example, logged comparison results 336 in FIG. 3, in the storage device (step 512).

Subsequent to logging the comparison results in step 512, the inventory control data processing system makes a determination as to whether a variance exists between the RFID scan result and the recorded inventory level for the profiled object (step 514). If a variance does not exist, no output of step 514, then the inventory control data processing system unlocks the locking mechanism of the enclosure that contains the profiled object and the inventory control system resumes normal operation (step 516). The process terminates thereafter.

If a variance does exist, yes output of step 514, then the inventory control data processing system performs variance analysis procedures, such as, for example, variance analysis procedures 338 in FIG. 3 (step 518). These variance analysis procedures are performed by the inventory control data processing system to assist entity personnel in discovering the source of the discrepancy between the recorded inventory levels and the scan results. Subsequent to performing the variance analysis procedures in step 518, the inventory control data processing system displays a variance report in a display unit, such as, for example, display unit 330 displays variance report 340 in FIG. 3, for personnel to read and take appropriate corrective action (step 520). In addition, the inventory control data processing system also sends the variance report to appropriate personnel located at other computers, such as, for example, network computer 414 in FIG. 4. The process terminates thereafter.

Thus, illustrative embodiments provide a computer implemented method, system, and computer usable program code for performing an inventory count of a profiled object in real time using RFID. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for inventory control by programmatically performing a digital rotating inventory count in near real-time, the computer implemented method comprising:
receiving, by a computer, a request to perform the digital rotating inventory count of a set of profiled objects, wherein the set of profiled objects is associated with at least one radio frequency identification tag;
locking, by the computer, the set of profiled objects to be scanned, wherein the locking of the set of profiled objects to be scanned comprises stopping, by the computer, movement of the set of profiled objects on a conveyor in a production line during the digital rotating inventory count;

scanning, by the computer, the set of profiled objects according to a profile associated with the set of profiled objects to perform the digital rotating inventory count of the set of profiled objects, wherein the profile specifies one or more profiles indicating what to scan during the digital rotating inventory count of the set of profiled objects, when to perform the digital rotating inventory count of the set of profiled objects, how to perform the digital rotating inventory count of the set of profiled objects, profiled object data, a specified profiled object location, and variance analysis procedures associated with the set of profiled objects;

responsive to receiving, by the computer, a scan result of the digital rotating inventory count, comparing, by the computer, the scan result with a recorded level for the set of profiled objects, wherein the recorded level is retrieved from a storage device in the computer;

logging, by the computer, a comparison result in the storage device, wherein the comparing of the scan result with the recorded level for the set of profiled objects generates the comparison result;

determining, by the computer, using the comparison result whether a variance exists between the scan result and the recorded level;

responsive to determining, by the computer, that the variance does not exist, unlocking, by the computer, the set of profiled objects, wherein the unlocking of the set of profiled objects comprises resuming, by the computer, movement of the set of profiled objects on the conveyor in the production line; and responsive to determining, by the computer, that the variance exists, displaying, by the computer, a variance report and performing variance analysis procedures comprising directing, by the computer, a mobile scanner to scan one of an area adjacent to the specified profiled object location of the set of profiled objects defined in the profile and another predefined area associated with the set of profiled objects to locate missing profiled objects associated with the set of profiled objects, and wherein the variance analysis procedures are based on actions defined in the profile associated with the set of profiled objects, and wherein the digital rotating inventory count is performed as scheduled, according to the profile.

2. The computer implemented method of claim 1, wherein the profile includes one or more profiles of one or more profiled objects in the set of profiled objects.

3. The computer implemented method of claim 1, wherein the set of profiled objects comprises an inanimate object.

4. The computer implemented method of claim 1, wherein the set of profiled objects includes one or more profiled objects.

5. The computer implemented method of claim 4, wherein the one or more profiled objects are counted individually or in a group, and wherein the group is counted by a multiple of a unit comprising one of a box, pallet, bin, room, building, or yard that contains the one or more profiled objects.

6. The computer implemented method of claim 1, wherein the set of profiled objects includes a radio frequency identification tag, and wherein the radio frequency identification tag is from a group consisting of a shortwave, a high frequency, an ultra-high frequency, a microwave, a wireless fidelity, and a Bluetooth radio frequency identification tag.

7. The computer implemented method of claim 6, wherein the radio frequency identification tag is read and counted by a radio frequency identification scanner, and wherein the computer uses the radio frequency identification scanner to perform the scanning of the set of profiled objects.

8. The computer implemented method of claim 1, wherein the digital rotating inventory count is automatically performed according to the profile in near real-time, and wherein the profiled object data may include a name, an identification number, a serial number, and a description of a profiled object, and wherein the determining, by the computer, using the comparison result whether the variance exists between the scan result and the recorded level is performed in near real-time.

9. The computer implemented method of claim 1, further comprising:

performing, by the computer, the digital rotating inventory count on the set of profiled objects at a same time.

10. The computer implemented method of claim 1, wherein the set of profiled objects has an associated profile including the profiled object data including information comprising a name, identification, serial number, and a description of an object.

* * * * *